United States Patent [19]
Mizuguchi et al.

[11] Patent Number: 5,543,942
[45] Date of Patent: Aug. 6, 1996

[54] LCD MICROLENS SUBSTRATE WITH A LENS ARRAY AND A UNIFORM MATERIAL BONDING MEMBER, EACH HAVING A THERMAL RESISTANCE NOT LOWER THAN 150°C

[75] Inventors: Yoshihiro Mizuguchi, Tenri; Hiroshi Hamada, Nara; Shigeru Aoyama, Kyoto; Tsukasa Yamashita, Nara, all of Japan

[73] Assignees: Sharp Kabushiki Kaisha, Osaka; Omron Corporation, Kyoto, both of Japan

[21] Appl. No.: 356,553

[22] Filed: Dec. 15, 1994

[30] Foreign Application Priority Data

Dec. 16, 1993 [JP] Japan .................................. 5-317145
Dec. 9, 1994 [JP] Japan .................................. 6-306650

[51] Int. Cl.⁶ ........................ G02F 1/1335; G02F 1/1333
[52] U.S. Cl. ............................ 359/40; 359/619; 359/74
[58] Field of Search ........................ 359/40, 41, 81, 359/74, 619, 620, 626, 455

[56] References Cited

U.S. PATENT DOCUMENTS

| | | | |
|---|---|---|---|
| 5,056,912 | 10/1991 | Hamada et al. | 353/38 |
| 5,076,511 | 12/1991 | Stein et al. | 244/3.22 |
| 5,093,574 | 3/1992 | Pratt et al. | 250/339 |
| 5,185,601 | 2/1993 | Takeda et al. | 359/59 |
| 5,225,935 | 7/1993 | Watanabe et al. | 359/619 |
| 5,335,102 | 8/1994 | Kanemori et al. | 359/59 |
| 5,381,187 | 1/1995 | Takamatsu et al. | 348/759 |

FOREIGN PATENT DOCUMENTS

| | | |
|---|---|---|
| 0426441A2 | 5/1991 | European Pat. Off. . |
| 54-17620 | 2/1979 | Japan . |
| 57-9180 | 1/1982 | Japan . |
| 60-165623 | 8/1985 | Japan . |
| 60-165624 | 8/1985 | Japan . |
| 60-165621 | 8/1985 | Japan . |
| 60-165622 | 8/1985 | Japan . |
| 60-262131 | 12/1985 | Japan . |
| 63-44624 | 2/1988 | Japan . |
| 3-202330 | 9/1991 | Japan . |
| 3230567 | 10/1991 | Japan . |
| 3-233417 | 10/1991 | Japan . |
| 3-248125 | 11/1991 | Japan . |
| 5-88161 | 4/1993 | Japan . |
| 5-134103 | 5/1993 | Japan . |
| 5-273512 | 10/1993 | Japan . |
| 6175120 | 6/1994 | Japan . |
| 6232379 | 8/1994 | Japan . |

OTHER PUBLICATIONS

Distributed–Index Planar Microlens . . . , M. Oikawa et al., Electronics Letters, Jun. 1981, vol. 17, No. 13, pp. 452–454.
New Fabrication Method of Plastic Micro Lens, T. Suzuki et al., 24th Microoptics Research Paper, pp. 20–25.
Technique for Monolithic Fabrication . . . , Z. Popovic et al., Applied Optics, vol. 27, No. 7, Apr. 1988, pp. 1281–1284.

Primary Examiner—Anita Pellman Gross
Assistant Examiner—Toan Ton

[57] ABSTRACT

The present invention discloses an opposed substrate for use in a liquid crystal display element, for example. The opposed substrate is constructed by a transparent substrate, microlenses formed on the substrate, a bonding layer, and cover glass. An alignment film and transparent electrodes are formed on the cover glass. The microlenses and the bonding layer are formed by selected resins which have thermal resistance to high temperatures not lower than 150° C., permit heating treatment for forming the alignment film, and satisfy the difference in the refractive indexes between the resins, $\Delta n \geq 0.1$, so as to enable the microlenses to have a numerical aperture not lower than 0.1. It is thus possible to prevent the decomposition of resins and separation of the microlens in heat treatment and to provide a high-quality, highly reliable liquid crystal display element.

17 Claims, 3 Drawing Sheets

LCD MICROLENS SUBSTRATE WITH A LENS ARRAY AND A UNIFORM MATERIAL BONDING MEMBER, EACH HAVING A THERMAL RESISTANCE NOT LOWER THAN 150°C

FIELD OF THE INVENTION

The present invention relates to a microlens substrate having microlenses, a high-definition liquid crystal display element using the microlens substrate, and a liquid crystal projector using the liquid crystal display element.

BACKGROUND OF THE INVENTION

The word "microlens" used in this specification means not only a minute lens whose size is not larger than several millimeters, but also a microlens array formed by one-dimensionally or two-dimensionally aligning a plurality of such minute lenses and a lenticular lens. In this specification, a liquid crystal projector not only means a device having a light source, a liquid crystal display element, image coloring means, an optical system for enlarging and projecting an image displayed by the liquid crystal display element onto a screen and means for driving the liquid crystal display element, but also includes an apparatus in which the above device and the screen are formed as a single piece.

The demand for projection-type liquid crystal display elements such as projection televisions as well as direct-viewing liquid crystal display elements increase. When a liquid crystal display element is used as a projection-type display, if images are enlarged without changing the number of pixels used in a conventional display element, a less definite view will result. In order to obtain highly definite images, it is necessary to increase the number of pixels when enlarging images.

However, if the number of pixels in a liquid crystal display element, particularly, in an active-matrix liquid crystal display element is increased, the area occupied by the pixels becomes relatively small while the area of a black matrix covering other than the pixels increases. If the area of the black matrix increases, the area of the apertures of pixels used for displaying images is decreased and the aperture ratio of the display element is lowered. When the aperture ratio is decreased, the screen becomes darker, resulting in lowered image quality.

In order to prevent a lowering of the aperture ratio due to an increase in the number of pixels, the formation of microlenses on one of the surfaces of a liquid crystal display element was proposed (see Japanese Publication for Unexamined Patent Applications No. 165621–165624/1985 and 262131/1985). The formation of a plurality of microlenses corresponding to the respective pixels enables light which is blocked by the black matrix in a conventional display element to be converged onto a pixel.

In addition, it is possible to use a microlens as: converging means in an optical pick up for laser disks, compact disks and magneto-optical disks; converging means for coupling an optical fiber with a light emitting element or a light receiving element; converging means or imaging means for improving the sensitivity of a one-dimensional image sensor for use in a solid image pickup element such as a CCD and in a facsimile machine (see Japanese Publication for Unexamined Patent Applications No. 17620/1979 and 9180/1982); imaging means for forming on a photoreceptor an image to be printed by a liquid crystal printer or an LED printer (see Japanese Publication for Unexamined Patent Application No. 44624/1988); and a filter for use in optical information processing. Thus, microlenses are used together with various optical elements or optical parts in an optical instrument.

A microlens is manufactured, for example, by the following methods: ion exchange method (Appl. Optics 21(6), p. 1052 (1982), and Electron Lett. 17, p. 452 (1981)); swelling method (Suzuki et al. "New Method for Manufacturing Plastic Microlens", 24th Meeting for Microoptics); "Technique for monolithic fabrication of microlens arrays" (Zoran D. Popovic et al., Appl. Optics 27, p. 1281 (1988)); and machining.

A microlens of distributed refractive indexes is obtained by the ion exchange method. A microlens having semi-spherical refracting surface or paraboloid of revolution (non-spherical refracting surface) is obtained by the other methods. If the microlens is semi-spherical, mass production of the microlens is available by using a semi-spherical microlens as a master (see the 2P method, Japanese Publication for Unexamined Patent Application No. 134103/1993).

By bonding such microlenses on a liquid crystal display element, the effective aperture ratio of the liquid crystal display element is improved, resulting in increased screen luminance. The effective aperture ratio means a transmission rate of a liquid crystal display element without a color filter and a polarizing plate.

However, a liquid crystal display element for use in a projection television, which shows highly definite images with a pixel pitch of around several tens μm, has a reduced aperture area. Thus, there is a limit to improving the effective aperture ratio because the effective aperture ratio depends on a relationship between the size of a spot of light converged by the microlens and the area of the apertures of pixels.

A diameter D of the converged light spot is calculated by $$D=2\cdot f\cdot \tan\theta \qquad (1)$$

where θ is a divergence half angle of incident light and f is a focal length of the microlens. If the area of the converged light spot becomes larger than the aperture area of pixels, light which does not fall on the pixels is not used for displaying images, thereby limiting the improvement of the effective aperture ratio.

In order to effectively converge light, the divergence θ of the incident light and the focal length f of the microlens may be decreased. The divergence θ of the incident light becomes smaller as the light emitting area of a light source in use becomes smaller and the distance from the light source to the liquid crystal display element becomes larger. With currently available techniques for light source, however, it is difficult to achieve an angle of less than several degrees for obtaining a longer life and necessary brightness for display. Consequently, there is a need to reduce the focal length f of the microlens and to locate the focal point of the microlens in the vicinity of the aperture of the pixel of the liquid crystal display element.

With the current manufacturing techniques, a liquid crystal display element including pixels with apertures having a side of around 30 μm and a pixel pitch of 50 μm is manufactured. With a liquid crystal display element of this size, if the divergence θ of illuminating light is 5°, the focal length needs to be set not larger than 170 μm according to the equation (1) in order to achieve a converged light spot with a diameter D of 30 μm. On the other hand, since the convergence of the microlens is proportional to the area thereof, the highest convergence is achieved by arranging microlenses at the same pitch as a pixel pitch P without space, i.e., by setting the microlens diameter to be equal to the pixel pitch P. In this case, the numerical aperture NA of the microlens is NA=P/(2·f)=0.147. With such a high definition liquid crystal display element in which the pixel pitch P is several tens μm, the numerical aperture of the microlens for reducing the size of a converged light spot is preferably set at least 0.1.

With the structure of the above-mentioned microlens, it is necessary to sandwich glass of a thickness of around 250 μm which corresponds to the focal length of 170 μm in the air (a value obtained by multiplying the refractive index of the glass) so that the focal point is located on the aperture of the pixel of the liquid crystal display element. In order to achieve this structure, a liquid crystal display element may be produced by using a piece of glass with a thickness of 250 μm as a substrate and bonding microlenses thereon. However, this method is not suitable for mass production because such thin glass of a thickness of 250 μm is difficult to handle.

Then, technique for reducing the focal length of a microlens is disclosed in Japanese Publication for Unexamined Patent Application No. 248125/1991. With this technique, cover glass or a cover film of a thickness corresponding to the focal length is attached to a surface of the microlens, and thus the microlens is fabricated within a substrate of a liquid crystal display element. Moreover, Japanese Publication for Unexamined Patent Application No. 233417/1991 discloses a method for achieving mass production and improved adhesion of a liquid crystal display element by forming a lens-like section on a lens substrate by a photosensitive resin according to the 2P method and attaching cover glass having the same coefficient of thermal expansion as the microlens to the lens substrate with a bonding agent having a refractive index different from that of the lens-like section.

However, with the technique for producing a microlens within a substrate of a liquid crystal display element, although there is no need to handle a very thin glass substrate, it is necessary to form transparent electrodes, an alignment film and a black matrix, if necessary, on a substrate (i.e., cover glass) after producing a microlens by attaching the cover glass to the substrate. Thus, this method may cause other problems, for example, a lowering of transparency of the liquid crystal display element due to deterioration of the microlens material and bonding agent, and the separation of the lens from the cover glass. In short, it is hard to say that the productivity in mass production is improved.

More specifically, in a conventional structure, transparent electrodes, an alignment film, a black matrix are formed on a glass substrate under a high temperature not lower than 150° C., generally, around 200° C. Such a heat treatment causes no trouble in the method in which a microlens is bonded to one of substrates after bonding these substrates (i.e., after heat treatment). However, if such a heat treatment is carried out after fabricating a microlens within a substrate, degradation of materials and separation of lens may occur as mentioned above because of the thermal resistance of the microlens material and of the bonding agent.

In order to avoid such problems, the heating temperature may be lowered when forming transparent electrodes, an alignment film and a black matrix on a glass substrate. However, if the heating temperature is lowered, the adhesion of film and the degree of orientation of liquid crystal will be lowered. As a result, the reliability of a liquid crystal display element and of a liquid crystal projector using the liquid crystal display element are lowered, thereby degrading the display quality. Thus, such a method is not suitable.

SUMMARY OF THE INVENTION

In order to solve the problems, the present invention is carried out and objects of the present invention are to fabricate a microlens substrate including a microlens having a satisfactory thermal resistance and a short focal length and to provide a high-quality highly reliable liquid crystal display element of improved screen luminance and a high-performance liquid crystal projector with the use of the microlens substrate.

In order to solve the above problems, a microlens substrate of the present invention, includes:

a first transparent substrate;

a microlens array or a lenticular lens formed on the first transparent substrate; and a second transparent substrate, wherein the second transparent substrate is bonded to the microlens array or the lenticular lens with a bonding agent, and the microlens array or the lenticular lens and the bonding agent are formed by materials having thermal resistance to high temperatures not lower than 150° C.

With this structure, since the microlens array or lenticular lens (hereinafter just referred to as the microlenses) and the bonding agent are formed by materials having thermal resistance to high temperatures not lower than 150° C., the microlens substrate has excellent thermal resistance and various processing is executable under high temperatures. Moreover, since the microlens substrate is formed by bonding the second transparent substrate (for example, cover glass) to the microlenses (for example, made of a heat-resistant resin) formed on the first transparent substrate with the bonding agent, the microlens is formed within the substrate. This structure enables the focal length of the microlens to become shorter than that of a microlens bonded to a predetermined substrate by post-processing.

Consequently, it is possible to obtain a microlens substrate which has excellent thermal resistance, permits various processing under high temperatures, and achieves a shorter focal length.

Accordingly, for example, a liquid crystal display element, which is constructed by forming transparent electrodes, an alignment film, and a black matrix, if necessary, on the microlens substrate as an opposed substrate and bonding the opposed substrate to an active matrix substrate, can never cause a lowering of transparency due to decomposition of bonding agent and the microlens material and the separation of the microlenses from the second transparent substrate even after executing thermal processing under high temperatures not lower than 150° C. for forming the transparent electrodes, the alignment film and the black matrix. It is thus possible to obtain a high-quality, reliable liquid crystal display element with improved screen luminance through the same processes as in the conventional manufacturing method.

The numerical aperture of the microlens array or the lenticular lens is preferably set at least 0.1. With the above-mentioned structure, since the numerical aperture is set not lower than 0.1, this microlens substrate satisfies such a requirement that, generally speaking, the numerical aperture of lens is preferably increased to at least 0.1 in order to converge light into a smaller spot, described in the prior art section. Thus, if a liquid crystal display element is constructed using this microlens substrate, the liquid crystal display element achieves a high definition display with a pixel pitch of around several tens μm.

It is also preferable to arrange the difference Δn in the refractive indexes between the microlens array or lenticular lens and the bonding agent of the microlens substrate to be not smaller than 0.1. In this case, since the difference Δn in the refractive indexes between the microlenses and the bonding agent of the microlens substrate is not smaller than 0.1, the microlens substrate also satisfies the above-mentioned requirement. More specifically, denoting a radius of the microlens, the focal length and the difference in the refractive indexes between the microlenses and the bonding agent as R, f and Δn, respectively, the numerical aperture of the lenses is approximated by R/f. Namely, the requirement to be satisfied is R/f≧0.1. Meanwhile, the relationship among these three variables is given by R=Δn·f by geometrical optics. Thus, the above-mentioned requirement is rewritten as Δn≧0.1. Hence, for example, a liquid crystal display element constructed by such a microlens substrate becomes a high definition display with a pixel pitch of around several tens μm.

If a liquid crystal display element including a microlens substrate having the above-mentioned structure is used for a liquid crystal projector, a high-quality, highly reliable liquid crystal projector is obtained. More specifically, since the microlens array, lenticular lens and bonding agent are formed from materials having resistance to temperatures not lower than 150° C., it is possible to prevent a heating treatment from causing the decomposition of the materials of the microlenses and bonding agent and a lowering of the transparency thereof. Consequently, when an image on the liquid crystal display element is enlarged and projected onto the screen, the image on the screen does not have changes in color nor become darker. Thus, a high-quality image is projected onto the screen. In this case, it is preferable to arrange a projection lens for converging light transmitted through the liquid crystal display element and projecting the light onto a screen to have a numerical aperture larger than that of the microlens array or lenticular lens. With this arrangement, the loss of light in the projection lens is certainly decreased, thereby displaying significantly bright projected images on the screen.

For a fuller understanding of the nature and advantages of the invention, reference should be made to the ensuing detailed description taken in conjunction with the accompanying drawings.

DETAILED DESCRIPTION OF PREFERRED EMBODIMENTS

[Embodiment 1]

Figure 1:
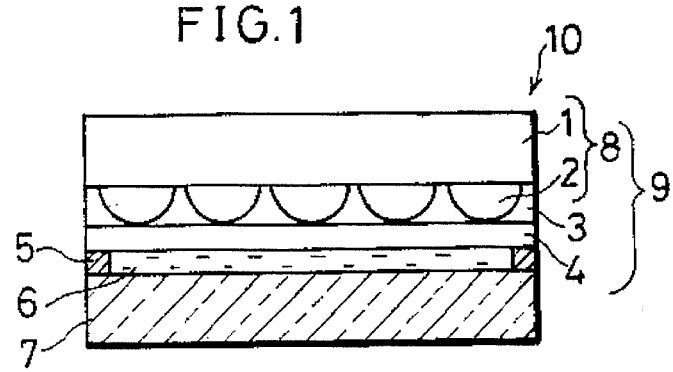
FIG. 1 is a cross section for explaining a structure of a liquid crystal display element according to one embodiment of the present invention.
Figure 2:
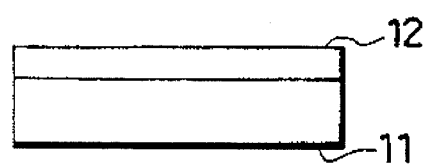
FIGS. 2(a) to 2(d) are explanatory views for explaining a process of manufacturing a stamper which is used by the 2P method.
Figure 2:
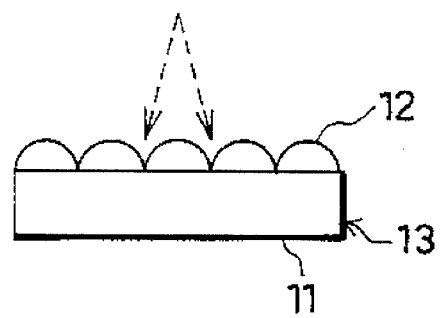
Figure 2:
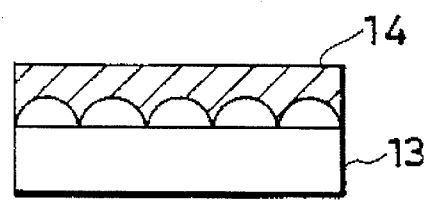
Figure 2:
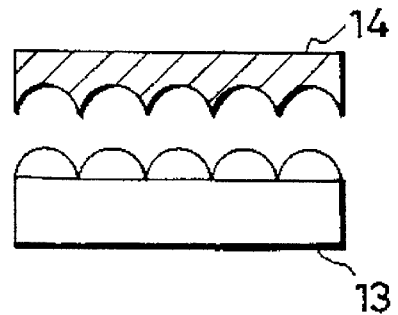
Figure 3A:
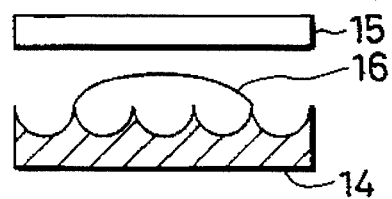
FIGS. 3(a) to 3(d) are explanatory views for explaining a process of manufacturing a microlens array using the stamper.
Figure 3B:
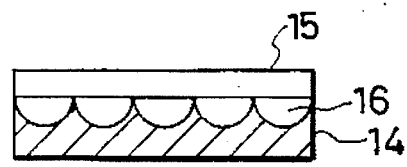
Figure 3C:
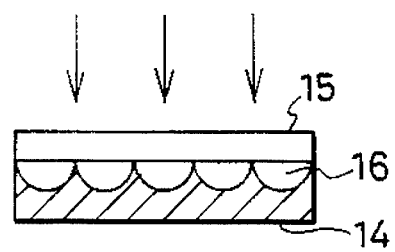
Figure 3D:
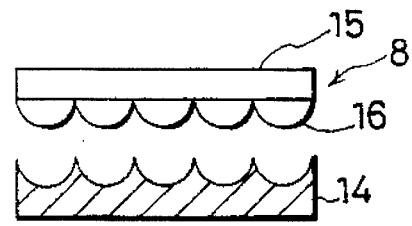

The following description discusses one embodiment of the present invention with reference to FIGS. 1 to 2. In this embodiment, a microlens substrate of the present invention is used as an opposed substrate in a liquid crystal display element. However, this embodiment is not intended to limit the use of the microlens substrate of the present invention. Needless to say, the microlenses of the present invention are utilized in various fields described in the prior art section.

A liquid crystal display element according to this embodiment is an active-matrix liquid crystal display element, and includes a transparent substrate 7 made of quartz glass as shown in FIG. 1. Formed on the transparent substrate 7 are pixel electrodes, switching elements, and buslines, not shown. A liquid crystal layer 6 is sealed in a space between the transparent substrate 7 and an opposed substrate (i.e., the microlens substrate of the present invention) 9 facing the transparent substrate 7 by a sealing material 5.

The opposed substrate 9 is constructed by a transparent substrate (first transparent substrate) 1 made of quartz glass, a microlens 8, a bonding layer 3 of a bonding agent, and cover glass (second transparent substrate) 4 made of quarts glass.

The microlens 8 is a so-called microlens array having a plurality of lens sections 2 which correspond to the respective pixel electrodes on the transparent substrate 7. In this embodiment, each of the lens sections 2 of the microlens 8 is shaped into a semi-spherical convex lens having a spherical surface by the above-mentioned 2P method.

With the 2P method, a mold called a stamper for the microlens array is first produced. Then, a large number of microlens arrays are fabricated using the stamper. This process is simply described below with reference to FIGS. 2 and 3.

First, the process of producing the stamper is explained with reference to FIG. 2.

(a) Preparing a substrate 11 and applying an electron beam resist 12 onto the substrate 11.

(b) Softening and shaping the electron beam resist 12, which has been patterned by the exposure of an electron beam, into a convex lens for producing a microlens array master 13.

(c) Introducing a stamper material such as nickel on the master 13 by electroforming so as to produce a nickel stamper 14.

(d) Separating the stamper 14 from the master 13. As a result, the stamper 14 has a concave shape corresponding to the convex shape of the microlens array. This is used as a mold for the microlens array.

The process of producing the microlens array with the use of the stamper 14 is explained below with reference to FIG. 3.

(a) Preparing a transparent substrate 15, and introducing an ultraviolet sensitive resin (a so-called UV hardening resin) 16 in the stamper 14.

(b) Sandwiching and pressing the introduced ultraviolet sensitive resin 16 by the stamper 14 and the transparent substrate 15 so that the resin 16 spreads over the entire lens surface.

(c) Hardening the ultraviolet sensitive resin 16 by ultraviolet light passed through the transparent substrate 15.

(d) Separating the transparent substrate 15 and the ultraviolet sensitive resin 16 after hardened from the stamper 14. The separated object is a microlens array.

Transparent electrodes, an alignment film and a black matrix, not shown, are formed on a surface of the cover glass 4 facing the liquid crystal layer 6. These are formed under high temperatures not lower than 150° C. after bonding the microlens 8 and the cover glass 4 to form a microlens substrate. Therefore, the microlens 8 and the bonding layer 3 need to have thermal resistance so that they are not decomposed nor deformed and that the transparency thereof is not lowered even at temperatures higher than 150° C.

Figure 4:
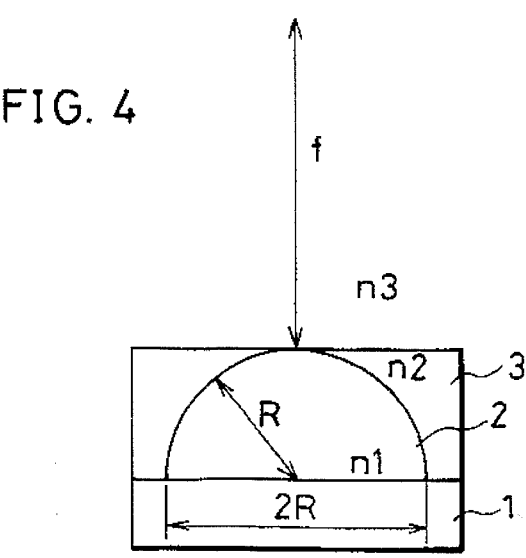
FIG. 4 is a cross section of an essential section for explaining a semi-spherical microlens (having a spherical surface) on a microlens substrate in the liquid crystal display element.

FIG. 4 illustrates an enlarged view of an essential section of the lens section 2 of the microlens 8 formed on the transparent substrate 1. In FIG. 4, n1, n2, n3 (=1) represent refractive indexes of the microlens 8, the bonding agent 3 and the air, respectively. The difference $\Delta n$ in the refractive indexes of the resins is defined by $$\Delta n = n1 - n2 \qquad (2)$$

Additionally, in FIG. 4, R is a radius of curvature (i.e., a half of the length of the aperture of the lens) of the lens section 2, and f is a focal length of the lens section 2 in the air. As described above, in order to decrease the diameter of a converged light spot, it is essential to select a resin having a refractive index satisfying $\Delta n \geq 0.1$.

In this embodiment, in order to satisfy the above-mentioned two conditions, the microlens 8 was formed by a photosensitive resin "UV-4000" having a refractive index n=1.567 and the bonding layer 3 was formed by a photosensitive resin "UV-1000" having a refractive index n=1.453. Both UV-4000 and UV-1000 are manufactured by Daikin Kogyo Co., Ltd.

The thermal decomposition temperatures of these resins are not lower than 150° C., and thermal decomposition or color changes were not observed when vacuum depositing the transparent electrodes and the black matrix under temperatures not lower than 150° C. $\Delta n=0.114$ is obtained by the equation (2). The microlens 8 suitable for a liquid crystal display element having the structure mentioned in this embodiment and a pixel pitch of 29 μm×24 μm was designed based on the value. As a result, when the lens section 2 had a spherical surface whose radius of curvature is 18.8 μm, the focal length f in the air was 165 μm. Since the refractive index of quartz is 1.46, the thickness of the cover glass 4 becomes 240 μm. In short, this microlens 8 improves the effective aperture ratio of the liquid crystal display element.

As described above, in the liquid crystal display element of this embodiment, the microlens substrate including the microlens 8 and the bonding agent 3 which are formed by the heat-resistant resins is used as the opposed substrate 9 in the liquid crystal display element. Therefore, even if heat is applied to the opposed substrate 9 when forming the alignment film, the transparent electrodes and the black matrix, decomposition and deformation of the materials can never occur. It is thus possible to produce a liquid crystal display element by carrying out the same processes under the same manufacturing conditions as the conventional processes and conditions, and to improve the reliability of the microlens 8 and of the liquid crystal display element.

Moreover, since the microlens 8 having a large numerical aperture is attached by the bonding layer 3 having a refractive index different from that of the microlens 8, it is possible to produce lens effects even when the lens sections 2 and the bonding layer 3 are in contact with each other. Consequently, the focal length of the microlens 8 is shortened and the convergence thereof is increased. It is thus possible to obtain a high-quality highly reliable liquid crystal display element with improved screen luminance.

Instead of the heat-resistant resins used in this embodiment, the materials listed below, which have resistance to high temperatures not lower than 150° C. may be used for forming the microlens 8. The microlens 8 may be formed by the following photosensitive resins: "RC-8766" (refractive index n=1.534) from Dainippon Ink & Chemicals, Inc.; and "MO1" (refractive index n=1.52), "UT20" (refractive index n=1.51), "HO2" (refractive index n=1.63) and "HV2" (refractive index n=1.63) from Ardel. The bonding layer 3 may be formed by the following photosensitive resins: "HNA-101" (refractive index n=1.37) from Dainippon Ink & Chemicals, Inc.; and UV-2000 (refractive index n=1.477) and "UV-3000" (refractive index n=1.498) from Daikin Kogyo Co., Ltd.

In this embodiment, the transparent substrate 1, the cover glass 4, and the transparent substrate 7 are formed by the same material. The reason for this is to prevent the separation of the microlens 8 and the respective substrates due to different coefficients of thermal expansion. Considering productivity, it is desirable to use ultraviolet sensitive resins rather than thermosetting resins for the microlens 8 and the bonding layer 3.

[Embodiment 2]

In embodiment of the present invention, a liquid crystal projector is manufactured using the liquid crystal display element of the above-mentioned embodiment. The use of the liquid crystal display element having an increased effective aperture ratio achieves definite images and a high-quality liquid crystal projector.

Figure 5:
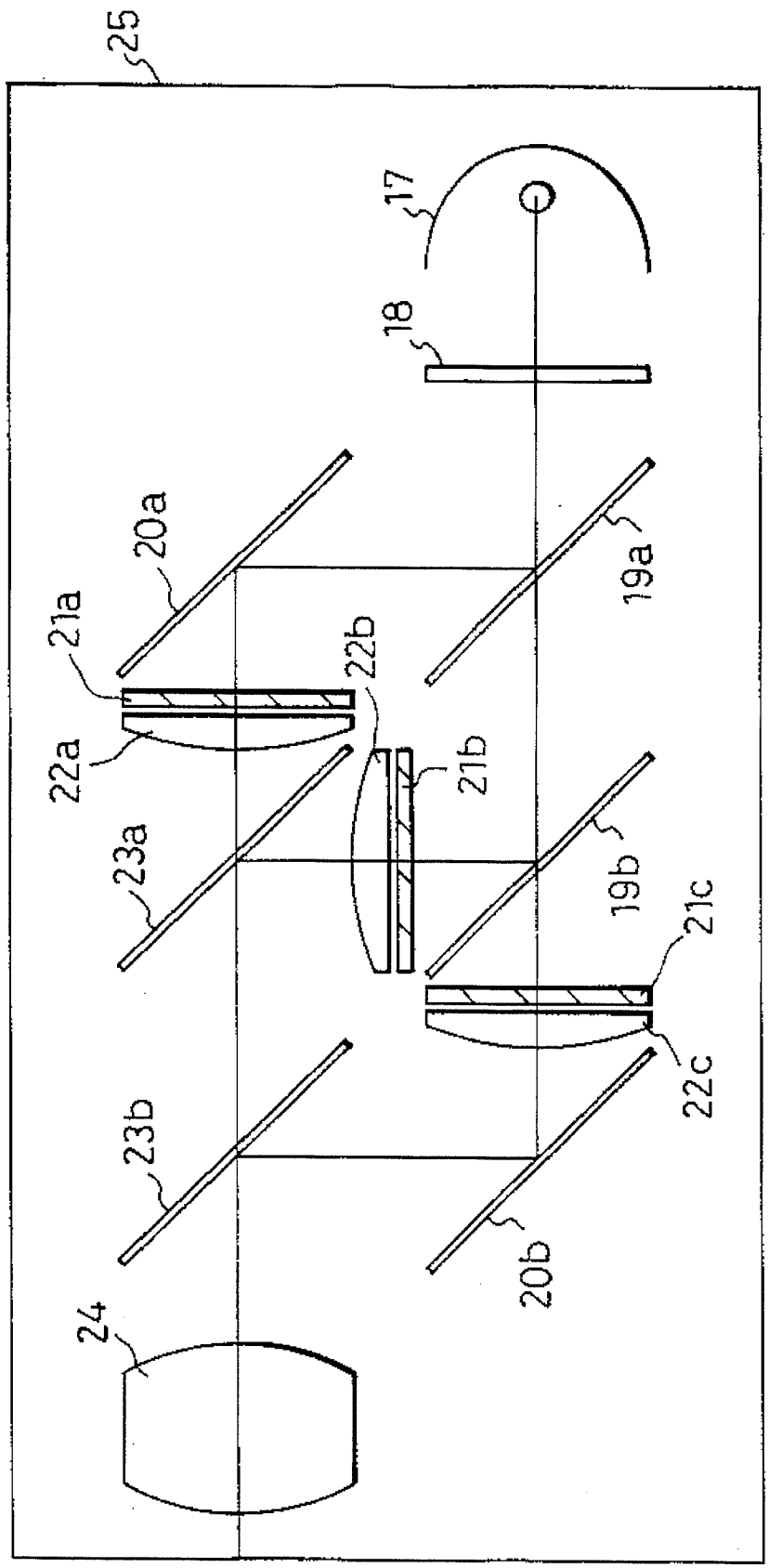
FIG. 5 is a view explaining an essential structure of a liquid crystal projector using the liquid crystal display element.

The following description discusses in detail a liquid crystal projector using a liquid crystal display element utilizing the microlens substrate of Embodiment 1 with reference to FIG. 5.

The liquid crystal projector includes an optical system 25 in FIG. 5. In the optical system 25, light irradiated by a white light source 17 such as a metal halide lamp is guided to dichroic mirrors 19a and 19b through a UV-IR filter 18. With the dichroic mirrors 19a and 19b, the incident light is separated into three primary colors: red, green and blue.

For example, the dichroic mirror 19a reflects only the blue light, and the dichroic mirror 19b reflects only the green light. In this case, the blue light separated by the dichroic mirror 19a is guided to a liquid crystal display element 21a through a reflecting mirror 20a. The green light and red light transmitted through the dichroic mirror 19a fall on the dichroic mirror 19b. The dichroic mirror 19b reflects only the green light toward a liquid crystal display element 21b. The red light is transmitted through the dichroic mirror 19b and guided to a liquid crystal display element 21c.

Each of the liquid crystal display elements 21a to 21c includes the microlens substrate explained in Embodiment 1, and displays images with primary colors based on video signals. The blue light transmitted through the liquid crystal display element 21a falls on a dichroic mirror 23a through a field lens 22a. The green light transmitted through the liquid crystal display element 21b falls on the dichroic mirror 23a through a field lens 22b. The red light transmitted through the liquid crystal display element 21c falls on a dichroic mirror 23b through a field lens 22c and a reflecting mirror 20b. The primary color light transmitted through the liquid crystal display elements 21a to 21c is synthesized by the dichroic mirrors 23a and 23b, and guided to the projection lens 24. Then, enlarged images are projected onto a screen, not shown.

In the liquid crystal projector, as the liquid crystal display element has a smaller size (becomes more definite), a microlens having a shorter focal distance is provided for each pixel. With this arrangement, since light which is blocked by the black matrix in a conventional high-definition liquid crystal display element is effectively converged onto the aperture of a pixel by the microlens, a bright display is achieved. More specifically, since the microlens array, lenticular lens and bonding agent are formed from materials having resistance to temperatures not lower than 150° C., it is possible to prevent a heating treatment from causing the decomposition of the materials of the microlenses and bonding agent and a lowering of the transparency thereof. Consequently, when an image on the liquid crystal display element is enlarged and projected onto the screen, the image on the screen does not have changes in color nor become darker. Thus, a high-quality image is projected onto the screen.

After the light is converged into a spot by the microlens, it travels toward the projection lens 24 while being diverged from the aperture of a pixel at an angle (diverging angle) which is determined by the numerical aperture of the pixel. In order to converge the divergent light with a small loss by the projection lens 24, it is desirable to decrease the focal distance f of the projection lens 24 and increase the aperture D thereof. It is thus preferable to set D/2f that is the numerical aperture of the projection lens 24 larger than the numerical aperture of the microlens. Therefore, when a projection lens 24 having a numerical aperture not smaller than 0.1 is used to meet the requirements for the numerical aperture of the microlens, it is possible to reduce the loss of light in the projection lens 24, thereby displaying highly bright projected images on the screen.

In the above explanation, the dichroic mirror 19a reflects only the blue light, and the dichroic mirror 19b reflects only the green light. However, the present invention does not necessarily have this structure. Here, it is only necessary to separate the light irradiated by the white light source into three primary colors: red, green and blue.

As described above, a microlens substrate of the present invention includes: a first transparent substrate; a microlens array or a lenticular lens (hereinafter referred to as the microlenses) formed on the first transparent substrate; and a second transparent substrate, wherein the second transparent substrate is bonded to the microlenses with a bonding agent, and wherein the microlenses and the bonding agent are formed by materials having thermal resistance to high temperatures not lower than 150° C.

Those microlenses have excellent thermal resistance, and permit various processing under high temperatures. For instance, if a substrate including the microlenses formed therein is used for one of substrates constructing a liquid crystal display element, and if the microlenses are heated to high temperatures in fabricating the liquid crystal display element, the liquid crystal display element is fabricated under the same manufacturing conditions as for a conventional liquid crystal display element without causing decomposition and deformation of the microlens material and the bonding agent.

Moreover, since the microlens substrate of the present invention is fabricated by bonding the second transparent substrate (for example, cover glass) to the microlenses (for example, heat-resistant resin) on the first transparent substrate, the microlenses are formed within the substrate. This structure enables the focal length of the microlenses to become shorter than that of a microlenses bonded as separate pieces to a predetermined substrate by post-processing.

If the microlens substrate having this structure is used for a liquid crystal display element, a high-quality highly reliable liquid crystal display element with increased luminance (increased effective aperture ratio) is achieved. Furthermore, with the use of such a liquid crystal display element having an increased effective aperture ratio, highly definite images are obtained and a high-quality liquid crystal projector is achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A microlens substrate comprising:

a first transparent substrate;

an array of converging members for converging incident light, said converging members being made of a material having thermal resistance to high temperatures not lower than 150° C. and being arranged on said first transparent substrate;

a second transparent substrate placed on said converging members; and a bonding member, made of a uniform material having thermal resistance to high temperatures not lower than 150° C., for bonding said converging members and said second transparent substrate.

2. The microlens substrate according to claim 1, wherein said converging members are a microlens array or a lenticular lens.

3. The microlens substrate according to claim 2, wherein a numerical aperture of said microlens array or lenticular lens is not smaller than 0.1.

4. The microlens substrate according to claim 2, wherein the difference $\Delta n$ in refractive indexes between said microlens array or lenticular lens and said bonding member is not smaller than 0.1.

5. The microlens substrate according to claim 1, wherein said converging members and said bonding member are formed by ultraviolet sensitive resins.

6. A liquid crystal display element comprising an opposed substrate including:

(a) a first transparent substrate;

(b) an array of converging members for converging incident light, said converging members having thermal resistance to high temperatures not lower than 150° C. and being arranged on said first transparent substrate;

(c) a second transparent substrate placed on said converging members, and (d) a bonding member made of a uniform material having thermal resistance to high temperatures not lower than 150° C., for bonding said converging members and said second transparent substrate, wherein transparent electrodes, an alignment film, and a black matrix are formed on said opposed substrate, said liquid crystal display element further comprising:

an active matrix substrate; and a liquid crystal layer formed between said opposed substrate and said active matrix substrate.

7. The liquid crystal display element according to claim 6, wherein said first transparent substrate, said second transparent substrate, and said active matrix substrate are formed by the same material.

8. The liquid crystal display element according to claim 6, wherein said converging members and said bonding member are formed by ultraviolet sensitive resins.

9. The liquid crystal display element according to claim 6, wherein said converging members are a microlens array or a lenticular lens having a numerical aperture not smaller than 0.1.

10. The liquid crystal display element according to claim 6, wherein said converging members are a microlens array or a lenticular lens, and the difference Δn in refractive indexes between said microlens array or lenticular lens and said bonding member is not smaller than 0.1.

11. A liquid crystal projector using a liquid crystal display element, said liquid crystal display element comprising:

(1) an opposed substrate including a first transparent substrate, an array of converging members for converging incident light, said converging members having thermal resistance to high temperatures not lower than 150° C. and being arranged on said first transparent substrate, a second transparent substrate placed on said converging members, and a bonding member made of a uniform material having thermal resistance to high temperatures not lower than 150° C., for bonding said converging members and said second transparent substrate, wherein transparent electrodes, an alignment film and a black matrix are formed on said opposed substrate;

(2) an active matrix substrate; and (3) a liquid crystal layer formed between said opposed substrate and said active matrix substrate, said liquid crystal projector comprising a projection lens for projecting light transmitted through said liquid crystal display element onto a screen, wherein a numerical aperture of said projection lens is larger than a numerical aperture of said converging members.

12. The liquid crystal projector according to claim 11, wherein said converging members and said bonding member are formed by ultraviolet sensitive resin.

13. The liquid crystal projector according to claim 11, wherein said converging members are a microlens array or a lenticular lens having a numerical aperture not smaller than 0.1.

14. The liquid crystal projector according to claim 11, wherein said converging members are a microlens array or a lenticular lens, and the difference Δn in refractive indexes between said microlens array or lenticular lens and said bonding member is not smaller than 0.1.

15. A method for manufacturing a microlens substrate comprising the steps of:

preparing a first transparent substrate;

forming an array of converging means, made of a material having a thermal resistance to high temperatures not lower than 150° C. on said first transparent substrate, for converging incident light;

preparing a second transparent substrate; and bonding said converging means and said second transparent substrate with a bonding member made of a uniform material having thermal resistance to high temperatures not lower than 150° C.

16. The method of claim 15, further including the subsequent step of:

forming transparent electrodes, an alignment film, and a black matrix on said second transparent substrate under temperatures not lower than 150° C.

17. The method of claim 15, wherein the bonding member is a single material including photosensitive resin.

* * * * *